United States Patent

Bruns

Patent Number: 5,368,954
Date of Patent: Nov. 29, 1994

[54] DEVICE ON ELECTRIC POWER HAND TOOLS

[75] Inventor: Joachim Bruns, Lichtenwald, Germany

[73] Assignee: Robert Bosch GmbH, Stuttgart, Germany

[21] Appl. No.: 30,127
[22] PCT Filed: Sep. 21, 1991
[86] PCT No.: PCT/DE91/00750
 § 371 Date: Mar. 11, 1993
 § 102(e) Date: Mar. 11, 1993
[87] PCT Pub. No.: WO92/05919
 PCT Pub. Date: Apr. 16, 1992

[30] Foreign Application Priority Data
 Oct. 2, 1990 [DE] Germany ............... 4031090

[51] Int. Cl.⁵ .................................. H01M 2/10
[52] U.S. Cl. ...................... 429/97; 429/123; 439/338; 439/366
[58] Field of Search .......... 429/97, 99, 123; 439/131, 338, 366, 372

[56] References Cited

U.S. PATENT DOCUMENTS

| | | | |
|---|---|---|---|
| 3,843,224 | 10/1974 | Gerke et al. | 439/366 |
| 5,122,427 | 6/1992 | Flowers et al. | 429/123 X |

FOREIGN PATENT DOCUMENTS

| | | |
|---|---|---|
| 0199241 | 10/1986 | European Pat. Off. |
| 0255568 | 2/1988 | European Pat. Off. |
| 3742268 | 6/1989 | Germany |
| 3902442 | 8/1989 | Germany |
| 8802242 | 4/1988 | WIPO |

Primary Examiner—Stephen Kalafut
Attorney, Agent, or Firm—Michael J. Striker

[57] ABSTRACT

For the attachment of a battery pack to a power hand tool, a plug-type connection is suggested which has a circular insertion part on the battery casing and a corresponding locating arrangement (3) on the power hand tool. Both parts have concentric power contacts and locking means, which when the casing (16) is axially inserted, engage automatically. By a short twist, the locking means can be released, and the battery casing (16) can be removed for recharging.

11 Claims, 2 Drawing Sheets

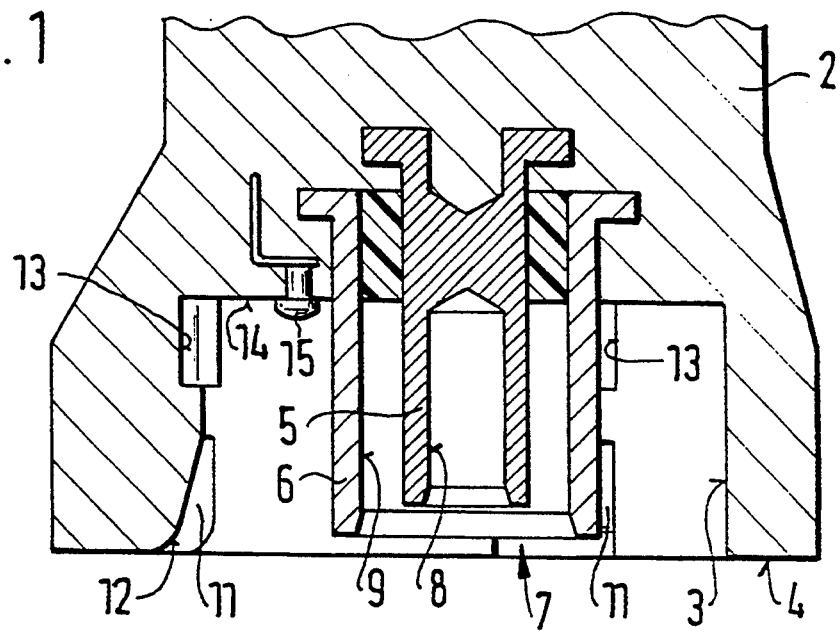
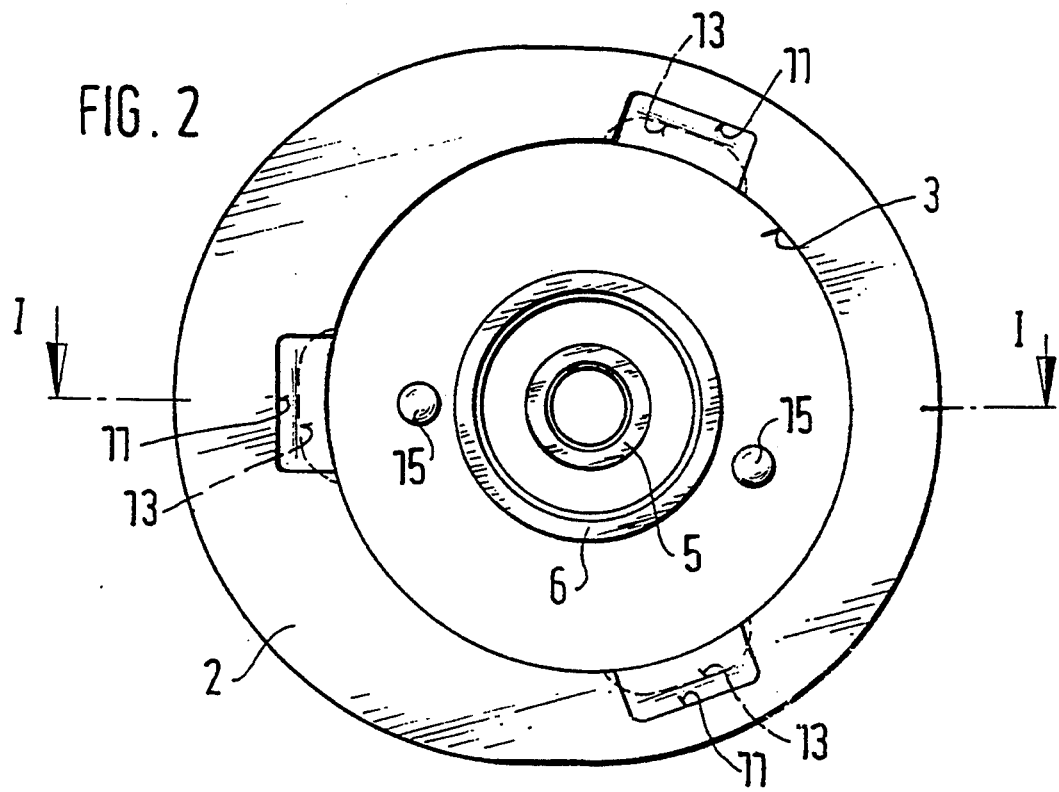

DEVICE ON ELECTRIC POWER HAND TOOLS

BACKGROUND OF THE INVENTION

The present invention relates to a device on electric hand power tools for a mechanical and electrical coupling of batteries.

More particularly, it relates to a device of the above mentioned general type, which has a locating arrangement for coupling of batteries.

From DE-A-37 42 268, an electric tool with a facility for locating and retaining battery packs in and/or on the tool casing is known, in which the battery pack can be fixed to the hand tool by means of an additional ring. The electric tool, the battery pack, and the ring, are fitted with locking elements, and a pushing and turning movement are required for the coupling of the battery pack. Before locating the battery pack, the user must further make sure that the ring is in the correct rotational position relative to the electric tool. The manufacture and the operation of this coupling facility are relatively elaborate. Moreover, the battery contacts are open to the outside of the battery pack, which can lead to short circuiting.

SUMMARY OF THE INVENTION

Accordingly, it is an object of the present invention to provide a device for mechanical and electrical coupling of batteries on electric power hand tools, which avoids the disadvantaged of the prior art.

In keeping with these objects and with others which will become apparent herinafter, one feature of the present invention resides, briefly stated, in a device for mechanical and electrical coupling of batteries in accordance with which within the locating arrangement a double bush is arranged with concentrically located electrical power contacts to which corresponding electrical power contacts on a battery casing are assigned, and locking means are arranged for detachable mounting of the battery casing, and the battery casing can be rotated in the locating arrangement.

In accordance with another feature of the present invention a casing for mechanical and electrical coupling of batteries to electrical power hand tools is provided, which has a concentrically circular insertion part and, in accordance in addition, within the insertion part a double plug is provided with concentrically arranged electrical power contacts which are connected to the batteries and locking means is provided for attachment of the casing to the power hand tool.

When the device and the housing are designed in accordance with the present invention, they have the advantage that the connection of the batteries is simplified and that the electrical contacts are protected from bodily contact and shortcircuit. The subject of the invention does not require any operating element on the power hand tool, but requires, in addition to holding the unit, only one hand for connection and release of the battery casing. To prevent accidental release, an axial movement may be provided for, to take place before the turning movement.

In accordance with further advantageous developments and improvements it is of particular advantage that locking means which are designed as undercut recesses are provided in the locating arrangement of the power hand tool which are of angular design in the direction towards the push-in side, and in at least one circumferential direction, they are radiused or chamfered. This facilitates simple snap-in of the locking means on axial insertion of the battery casing into the locating arrangement, and a simple release of the locking means by twisting the battery casing against the locating arrangement. Coaxial grooves which are asymmetrically distributed at the circumference of the locating arrangement have the advantage that the battery casing can be inserted only in a defined twisting position, so that additionally arranged simple contact surfaces come into contact with their mating surface in a manner which is positionally correct for a signal transmission. This moreover ensures the correct twisting position appropriate for the tool, of the usually not circular battery casing. It is also of particular advantage to design the locking means, either on the locating arrangement or on the inserting part, as elastic detents which engage in an undercut at the respective mating part of the facility. The distribution of the locking means, corresponding to the distribution of grooves on the locating arrangement, ensures the correct twisting position of the battery casing vis-a-vis the power hand tool in a simple manner and without an additional device on the inserting part. The arrangement of the electrical power contacts within the coupling elements protects these from being accidentally contacted, which could result in corrosion or in short-circuiting. This is particularly important for the battery casing which users will occasionally and unthinkingly place in tool boxes.

The novel features which are considered as characteristic for the invention are set forth in particular in the appended claims. The invention, itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a cross-section through a locating arrangement of a power hand tool.

FIG. 2 shows a top view of this locating arrangement.

DESCRIPTION OF THE PREFERRED EMBODIMENT

Figure 3:
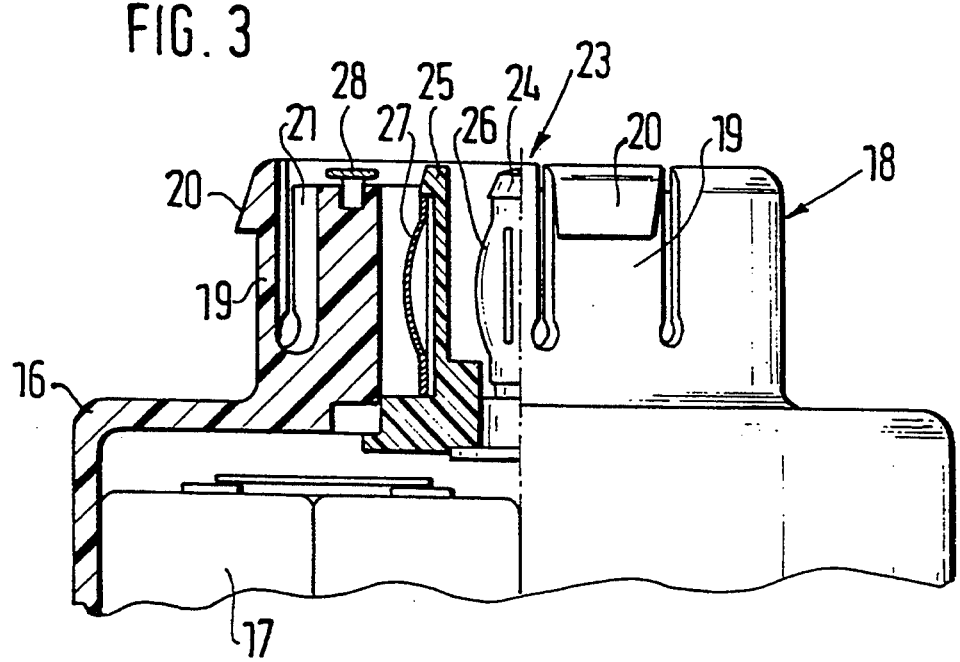
FIG. 3 shows a battery casing with the inserting part.

On a housing 2 of a power hand tool shown in part only FIGS. 1 and 2, a locating arrangement 3 which extends in a cupular shape into the housings 2 is arranged with a front face 4 facing outwards, which has an essentially circular cross-section. Concentrically situated within the locating arrangement 3 is an inner bush 5 and an outer sleeve 6, both of which are set back in relation to the front face 4. The bush 5 and the sleeve 6 form a double bush 7 with electrical power contacts 8 and 9. For this purpose, the bush 5 and sleeve 6 can be designed either as metal sleeves, or, they may be faced with metal on their inner side. The power contacts 8, 9 are electrically connected to a drive motor of the power hand tool which is not Shown.

The locating arrangement 3 has three coaxial grooves 11 asymmetrically distributed around its circumference. Towards the front face 4, the grooves 11 are expanded by guide-in chamfers 12. Undercut recesses 13, which are of angular design towards the front face 4, i.e. the insertion side, and radiused on both sides in the circumferential direction, are arranged on that inner end of the grooves 11 which faces away from the front face 4. On a base area 14 of the locating arrangement, two mushroom shaped contact areas 15 are asymmetrically arranged for signal transmission.

Figure 4:
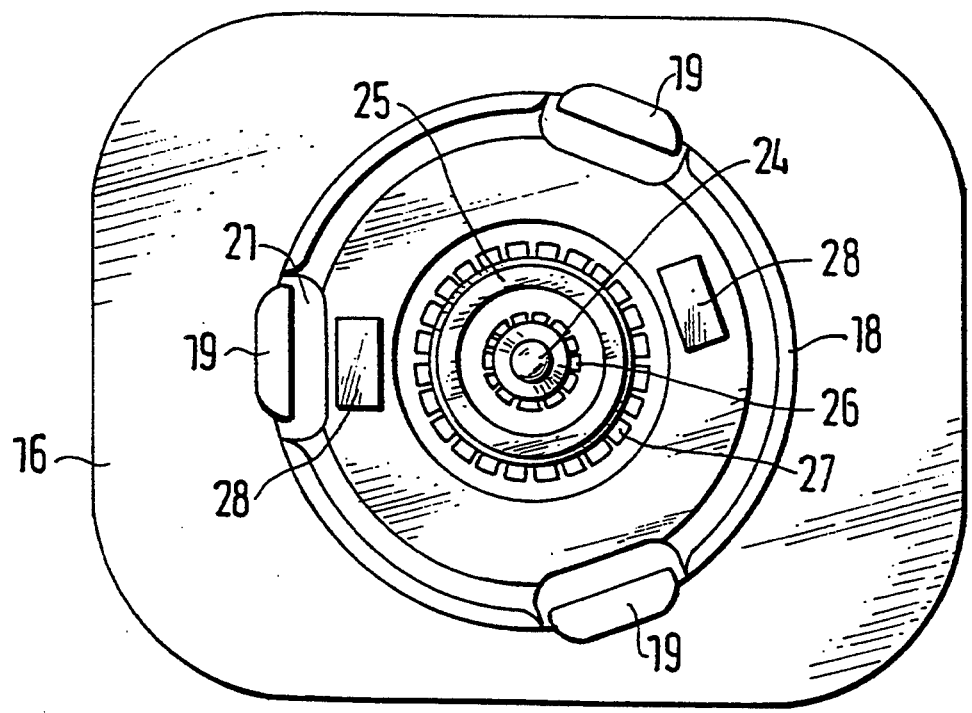
FIG. 4 shows a top view of the inserting part.

The casing 16, shown partially in FIGS. 3 and 4, in which preferably rechargeable batteries 17 will be accommodated, has an essentially circular insertion part 18 for connection with the power hand tool. Three locking means 19, designed as elastic detents, project asymmetrically, corresponding to the grooves 11, from the circular circumference. Each of the detents 19 has a projection 20, which when pushed into the locating arrangement 3 engages in the undercuts formed by the recesses 13. A cavity 21 is formed behind the detents 19, allowing the detents 19 to spring back towards the centre of the insertion part 18. A concentric double plug 23 with an inner plug pin 24 and a plug sleeve 25 arranged with a spacing around it, is centrally arranged in the inserting part 18. The two plug parts 24, 25 each have on their outer circumference an annular, springy, power contact 26, 27 which is connected to the batteries 17. The power contacts 26, 27 are accommodated concealed within the double plug 23 or the plug part 18, so that they cannot be touched by hand; for this purpose, they terminate even before the point of the plug pin 24 and the plug sleeve 25, and are axially overlapped in this area. Between the double plug 23 and the outer circumference of the plug part 18, there are contact faces 28 which may be of spring-loaded design, arranged opposite the contact faces 15. These contact faces are used for signal transmission, for example, for temperature monitoring of the rechargeable batteries 17.

The handling of the inserting device is extremely simple. The battery casing 16 is held in one hand and, according to the position of the detents 19 and the grooves 11, is simply inserted into the locating arrangement 3 in an axial direction. The detents 19 are pressed inwards along the guide-in chamfers 12 and subsequently engage automatically in the recesses 13. The insertion simultaneously effects the interconnection of the power contacts 8, 9 and 26, 27. The contact faces 15 and 29 will also, if required, come into conductive contact with each other. The casing 16 is thus, mechanically and electrically securely connected to the housing 2 of the power hand tool. To release the battery casing 16, it Should be twisted by approximately 30 degrees to the right or left. In this operation, the detents 19 slide with their radiused edges along the radiused edges of the recesses 13 and are deflected inwards during this action, until they have fully emerged from the recesses 13. The concentric arrangement of the power contacts does not obstruct the rotation of the battery casing 16. With the detents 19 disengaged, the battery casing 16 can be easily released from the power hand toll by axially withdrawing it.

In order to prevent accidental release of the battery casing 16, the twisting movements the casing in normal position can alternatively be prevented by appropriate means, such as providing in this region sharp edges to the recesses 13 and/or sharp side edges on the detents 13. To disengage the snap-in locking connection initially requires an axial pressure in the direction towards the locating arrangement 3, so that the detents 19 enter into the region of radiused edges—not shown—of the recess 13. In this position, disengagement of the snap-in connection as shown in the embodiment example is again possible, with the sharp edges of the detents 19 in appropriate circumstances sliding over the radiused edges of the recess 13.

It will be understood that each of the elements described above, or two or more together, may also find a useful application in other types of constructions differing from the types described above.

While the invention has been illustrated and described as embodied in a device for mechanical and electrical coupling of batteries on electric power hand tools and a casing for mechanically and electrically coupling to electric power hand tools, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features than, from the standpoint of prior art, fairly constitute essential characteristics of the generic or specific aspects of this invention.

What is claimed as new and desired to be protected by Letters Patent is set forth in the appended claims.

1. A device for mechanical and electrical coupling of batteries to electric power hand tools, comprising a locating arrangement having a substantially circular cross-section; a double bush located in said location arrangement and provided with concentrically arranged electrical power contacts connectable with electrical power contacts of batteries; and locking means provided in said locating arrangement for detachably mounting a battery casing so that the battery casing can be rotated in said locating arrangement.

2. A device as defined in claim 1, wherein said locking means is formed so that the battery casing can be connected to said locating arrangement by an axial insertion during which said locking means automatically lock the battery casing in said locating arrangement.

3. A device as defined in claim 2, wherein said locking means include recesses.

4. A device as defined in claim 4, wherein said recesses are angular at an insertion side and radiused in at least one circumferential direction.

5. A device as defined in claim 1, wherein said locating arrangement has coaxial grooves asymmetrically distributed around its circumference and having guide-in chamfers in a front region as considered in direction of insertion of the battery casing into said locating arrangement.

6. A device as defined in claim 1, wherein said locating arrangement has non-concentrically arranged contact faces for transmitting electrical signals.

7. A casing for batteries to provide mechanical and electrical coupling of the batteries to electrical power hand tools having a bush, the casing comprising a substantially circular insertion part, a double plug provided in said insertion part and having concentrically arranged electrical power contacts which are connectable to the batteries; and locking means provided in said insertion part for attaching said insertion part to a power hand tool.

8. A casing as defined in claim 7, wherein said locking means include elastic detents which engageable in an undercut recess on a locating arrangement of the power hand tool.

9. A casing as defined in claim 7, wherein said locking means project beyond a circumference of said insertion part and are insertable into grooves of the locating arrangement.

10. A casing as defined in claim 7, wherein said power contacts are arranged concealed within said insertion part.

11. A casing as defined in claim 7, wherein said insertion part has non-concentrically arranged contact faces for transmitting electrical signals.

* * * * *